United States Patent
Hamilton, II et al.

(10) Patent No.: US 8,010,815 B2
(45) Date of Patent: Aug. 30, 2011

(54) COMPUTATIONAL DEVICE POWER-SAVINGS

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 12/113,663

(22) Filed: May 1, 2008

(65) Prior Publication Data
US 2009/0276649 A1 Nov. 5, 2009

(51) Int. Cl.
*G06F 1/26* (2006.01)
*G01R 21/00* (2006.01)
*G05D 3/12* (2006.01)

(52) U.S. Cl. ........ 713/320; 713/300; 713/324; 713/340; 700/286; 700/295; 700/298; 700/300; 702/60; 702/61; 702/62; 702/63

(58) Field of Classification Search .................. 713/320, 713/340; 702/60–63; 700/286, 295, 298, 700/300
See application file for complete search history.

(56) References Cited

U.S. PATENT DOCUMENTS

| | | | |
|---|---|---|---|
| 5,506,790 A | 4/1996 | Nguyen | |
| 6,442,699 B1* | 8/2002 | Nakajima | 713/320 |
| 6,574,740 B1* | 6/2003 | Odaohhara et al. | 713/323 |
| 7,216,021 B2 | 5/2007 | Matsubara et al. | |
| 7,334,143 B2 | 2/2008 | Atkinson | |
| 7,360,106 B2* | 4/2008 | Kato et al. | 713/323 |
| 7,594,132 B2* | 9/2009 | Kim | 713/322 |
| 7,783,905 B2* | 8/2010 | Chang et al. | 713/320 |
| 2007/0245163 A1* | 10/2007 | Lu et al. | 713/300 |
| 2009/0177334 A1* | 7/2009 | Artman et al. | 700/300 |

FOREIGN PATENT DOCUMENTS

| | | |
|---|---|---|
| WO | PCT/IB2004/003862 | 9/2005 |
| WO | PCT/US2007/004082 | 8/2007 |

* cited by examiner

*Primary Examiner* — Brian T Misiura
(74) *Attorney, Agent, or Firm* — Patrick J. Daugherty; Driggs, Hogg, Daugherty & Del Zoppo Co., LPA (57) ABSTRACT

A user may invoke energy savings in the operation of a computational device performing a processing task. The device performs the processing task in the invoked energy savings mode and determines an energy amount expended by the device in performing the processing task in the energy savings mode, creating a net energy savings value as a difference between the energy amount expended and a standard energy expenditure amount predicted as required for the computational device to perform the processing task in high-performance mode. The device displays the net energy savings value to the user, with the user continuing the invoking of the energy savings mode or engaging another performance mode for the computational device as a function of the displaying.

15 Claims, 2 Drawing Sheets

COMPUTATIONAL DEVICE POWER-SAVINGS

FIELD OF THE INVENTION

The present invention generally describes means for a user to invoke power-saving methods on client-side computational devices. Means are also described for communicating energy savings data to the user.

BACKGROUND OF THE INVENTION

Green computing is sometimes defined as the study and practice of using computing resources efficiently. Typically, technological systems or computing products that incorporate green computing principles take into account economic viability, social responsibility, and environmental impact. A typical green computing method includes implementing environmentally friendly products, like those with the Energy Star rating, in an efficient system that maximizes energy use.

One of the goals of green computing is to use power generated from sources that are more environmentally friendly than coal-fired power stations. Some companies provide power from low impact sources, like windmills and hydro-electric dams. Other sources include locally-installed photovoltaic panels, which generate electrical energy from the sun, or power produced by nuclear power plants.

Point solutions for energy efficiency are relatively straightforward for data centers to implement, like orienting racks of servers in a data center to exhaust their heat in a uniform direction, reducing overall cooling costs. Difficulties arise where individual personal computer users are tasked with implementing energy and power savings themselves. As is known by those skilled in the art, devices and operating systems allow users to select suggested configurations for reducing energy consumption, the steps required in invoking energy savings configurations are often burdensome, inconvenient, or even difficult for users with minimal computer skills. Common solutions may also prohibit the continued processing or performing of a task in order to achieve the invoked energy savings; for example, though a user may select to reduce the amount of idle time required before his or her device automatically enters a lower-powered standby or idle mode, energy savings are only realized when the user stops actively engaging the device. Moreover, energy-savings methods often require the user to accept a corresponding reduction in computer processing speed or capabilities, and such performance reductions discourage users from selecting energy savings configurations. This may be particularly true when the costs of the energy used by faster/less efficient configurations are not born by the user or are not perceived by the user as large enough to justify reduced processing performance and/or increased times.

Thus, there is a need for improved methods and systems that address the above problems, as well as others.

SUMMARY OF THE INVENTION

Methods, devices, program products and systems are provided for a user to invoke energy savings in the operation of a computational device. Accordingly, methods comprise providing a computational device configured to perform a processing task in a high-performance mode; a user invoking an energy savings mode for the computational device to perform the processing task through a computational device interface, wherein the energy saving mode is more energy efficient than the high-performance mode; the computational device performing the processing task in the invoked energy savings mode; determining an energy amount expended by the computational device in performing the processing task in the invoked energy savings mode; determining a net energy savings value as a difference between the energy amount expended and a standard energy expenditure amount predicted as required for the computational device to perform the processing task in the high-performance mode; displaying the net energy savings value to the user; and the user continuing the invoking of the energy savings mode or engaging another performance mode for the computational device to perform the processing task as a function of the displaying.

Some methods comprise querying a policy table containing a plurality of possible computational device energy savings modes to identify at least one mode appropriate to the processing task; selecting a subset of the identified at least one appropriate mode queried wherein each of the selected subset is available to the user and suitable to a configuration of the device; and the user selecting one of the subset as the invoked mode. Methods also comprise displaying each of the selected subset with an associated predicted energy savings value.

In some methods, a determination is made that none of the plurality of possible energy savings modes are available or appropriate to the processing task; wherein displaying the subset comprises displaying alternative energy saving processes each implementable by the user by incorporating a new component into the computational device; and wherein the user selecting and implementing one of the available subset comprises the user incorporating the new component into the computational device and selecting a one of the alternative energy saving processes associated with the new component. Methods also comprise displaying energy savings comprising dynamically updating alternative energy saving processes and associated new components available to the user while the device is performing the processing task and displaying current and cumulative net energy savings. In some methods, the computational device comprises a plurality of computer processing unit cores, and wherein the implementing of the selected energy savings process comprises causing the computational device to continue to perform the processing task by suspending one of the cores or transferring one of the cores into a low power state as a function of a processing load imbalance.

Some methods comprise providing a slider having a pointer aligned to engage a graduated continuum scale; wherein the invoking comprises the user sliding the slider pointer into alignment with an index on the graduated continuum scale, the index correlated with a desired net energy savings value. In some methods, the determining of the net energy savings value further comprises awarding a benefit value to the user in proportion to the determined net energy savings value; and displaying the net energy savings value to the user further comprising dynamically displaying an accrued awarded benefit value. Some methods also comprise displaying an availability of a green energy source; wherein the user continues the invoking or engaging of another performance mode which comprises the user invoking a second energy savings mode, wherein invoking the second energy savings mode comprises correlating performance of the processing task with an availability of the green energy source.

In another aspect, methods are provided for deploying an application providing a computer infrastructure being operable to perform one or more of the method and/or process elements for a user to invoke energy savings in the operation of a computational device, for example, by a service provider who offers to implement, deploy, and/or perform functions for others. Still further, an article of manufacture comprising a computer usable medium having the computer readable program embodied in said medium may be provided. Such program codes comprise instructions which, when executed on a computer system, cause a computer system to perform one or more of the methods and/or process elements for a user to invoke energy savings in the operation of a computational device. Moreover, systems, articles and programmable devices configured for performing one or more of the method and/or process elements of the present invention for a user to invoke energy savings in the operation of a computational device, for example as described above, are also possible.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections
I. General Description
II. Computerized Implementation
I. General Description A green computing process may be defined as a method that relates to general energy management and using available technological resources efficiently. In one estimate, utilities burn up to a pound of coal for every two megabytes of data moving across the Internet. Also, a server farm housing computers that serve Internet web pages may have the power needs of a small steel mill, and in one example, aggregate server farm power costs were estimated at approximately $4 billion per year for 2005. Information technology ecosystems create an array of complexities, ranging from data center to client computing and from customer impacts to business impacts, with many investment and process decisions involving the trade off of energy savings for performance. Given all of the interdependencies and complexities, the derivation of consistent and coherent green computing processes is difficult, and thus there is no one single green computing solution for every situation.

In one aspect, difficulties arise in individual computer energy management. For example, a laptop with a beautiful video display may require a more expensive battery technology if weight is to be maintained as well as battery life. If a cheaper battery is used, the laptop may have a more energy-efficient CPU and hard drive, but be lower-performing, and moreover with more energy-hungry components squandering whatever energy or cost-savings that have been achieved. Also, many computer system manufacturers focus on performance, not energy efficiency because individual users tend to prefer faster performance speeds over energy efficiency.

The increasing high speed of modern processors is an important factor in growing power consumption. In general, a processor may be faster than needed, wasting energy and requiring more battery energy, or the internal temperature will be too high. Moreover, even if a user desired to identify a power consumption profile of a given device in order to select a lower power configuration for a given task, the relationship of power usage and performance capabilities to task requirements is not easily determined. A common way to obtain energy statistics of a processor's usage is by reading an energy meter attached to the system, using performance counters, or approximating the statistics from processor activities, an example being approximating cache energy expenditure by multiplying the number of accesses by the average energy use per access. These methods are cumbersome and generally not understood or even available to an individual user.

Figure 1:
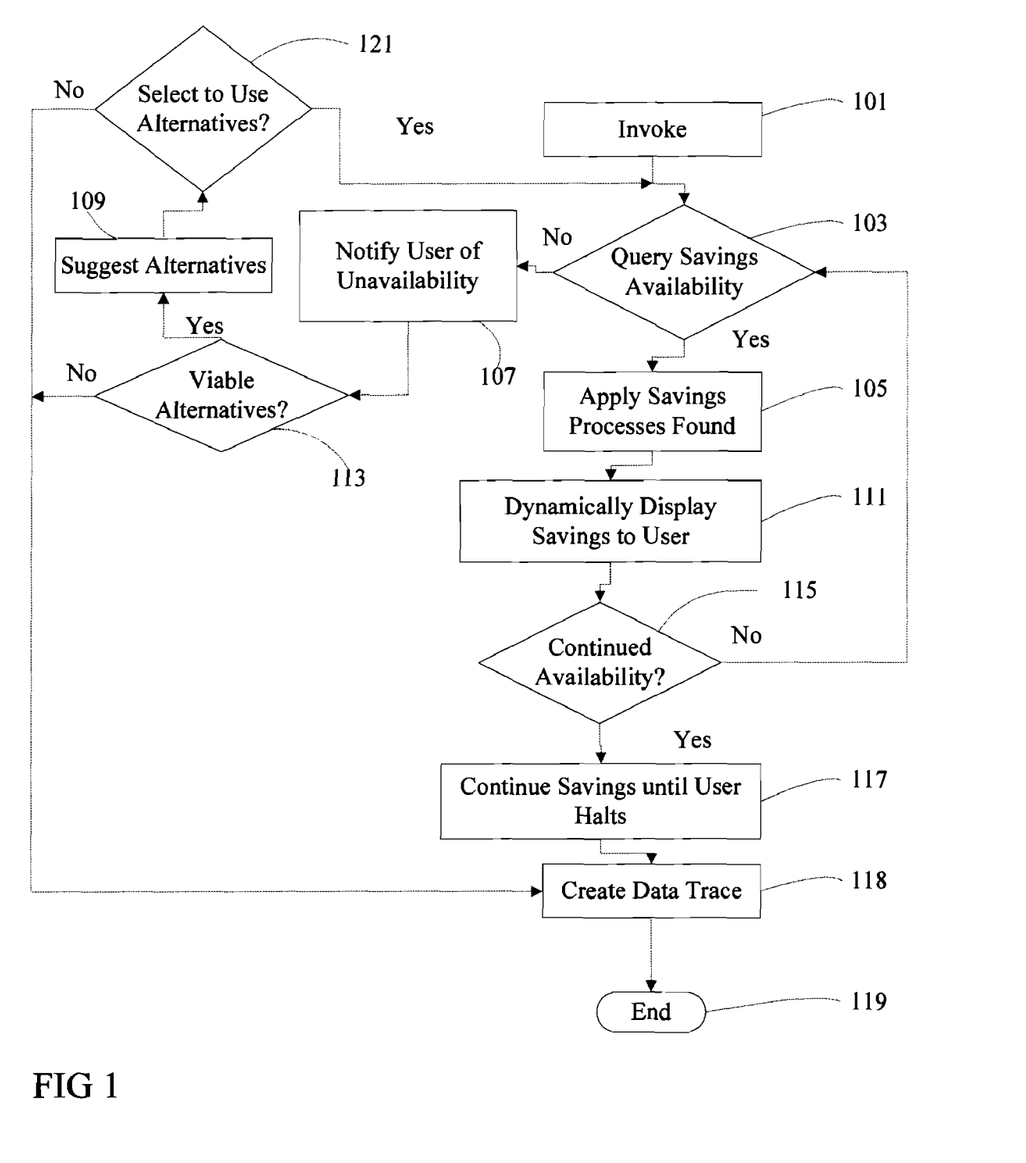
FIG. 1 is a flow chart illustrating a process and system for invoking reduced energy consumption and notifying a user of energy savings data according to the present invention.

FIG. 1 illustrates a process or system according to the present invention for invoking reduced energy consumption and notifying the user of energy savings data according to the present invention, in one aspect while still maintaining processing and performance capabilities. At 101 the user of a computing device desires the device to enter a reduced energy consumption mode. At 103 a query is made for possible energy saving methods. The methods available for selection may be organized as a function of preferences, system configurations, or a combination of both, and may be listed within a policy table. Examples of function-specified preferences and system configurations may include user-specified parameters; system administrator or other supervisor-created lists of efficiency methods approved for use on a company's network; client or customer specifications created for a specific project or series of projects; and government guidelines and regulations, like recommended EPA methods or Energy Star.

In some embodiments, a system administrator-created configuration queries a centrally controlled policy table or set of policy tables using a system where the user has to log onto a network to access the query. Systems and methods according to the present invention may also directly obtain device energy statistics in the background, automatically and without requiring actions or interventions by a user, for example by metering actual energy use, using performance counters, or approximating the statistics from device and device component activities. Thus, in some examples energy data may be obtained relative to a device memory component by approximating a component energy expenditure through observing and multiplying a number of accesses by an average energy use per access.

Energy savings and efficiencies may vary as a function of time periods or epochs used for performing the task. In one example, energy savings may vary as a function of variable and divergent time-period dependent utility rates, with higher energy credits or monetary savings obtainable through saving energy during higher/peek energy use periods. Thus, the present invention may use different time-dependent tables of available efficiencies, and in some examples tasks may be deferred or shifted to or spread over low demand evening and weekend hours.

Time-shifting may also be deployed to target green energy sourcing in order to use power generated from sources that are more environmentally friendly than conventionally carbon-emitting sources such as coal-fired power stations; for example, at periods of low demand a server or server farm may be able to operate partially or entirely from energy stored in batteries or other media, power that may have been generated from more efficient or low impact or low carbon emitting sources such as locally-installed photovoltaic solar panels, windmills and hydroelectric dams, thereby reducing or eliminating a need to supplement energy to a building or a local energy grid from more conventional and expensive energy sources as well as reducing overall energy consumption. In one aspect, energy savings may be directly related to energy costs and utility billing rate periods; utilities and other energy providers often structure their rates to encourage off-peak energy use, and/or the use of green sources that may be only or more available during a given time period. Therefore, correlating processing task energy use with lower energy billing rates often also correlates with maximizing green energy use or with periods when energy use results in a lower overall energy use profile for a supply grid.

In another aspect, execution of a green process according to the present invention may defer a process or computation to a less-busy period, time-shifting a task as a function of task priorities to reduce the overall energy footprint of a computational device or the process. In one example, when a server or server farm is not fully utilized the ambient temperature of the room housing the equipment decreases to a point in which the device fan or cooling unit may run at a lower speed, thereby saving energy: thus by deferring or scheduling a task in order to keep the equipment at a low utilization rate energy savings may be obtained. Accordingly, some embodiments of the present invention may incorporate "Nice" and "Renice" command scheduling in order to lower overall parallel task processing, for example as sometimes implemented in Unix™ and Linux© systems. Nice and Renice types of command scheduling allow a user to change the priority of a job at any time, wherein the higher the nice value set for a given task, the lower the priority of its process and the less processing resource demand it will make relative to other processes. Thus, according to the present invention, Nice/Renice methods may be used to keep overall processing activity at low total levels by spreading task processing tasks out evenly and avoiding maximum simultaneous processing of too many priority jobs. Accordingly, in one example invoking an energy savings mode at 101 of FIG. 1 may comprise maximizing a task nice value, enabling the device to defer the task when processing demands and associated energy needs and costs are high to a subsequent low-energy cost/requirement time.

In another embodiment, energy preference may be based on the type of computational system invoking the query; for example, if a high-power processor system invokes the query one table is accessed, but if a low-powered system initiates the query, another table is accessed. Many energy conservation actions may be included within a given policy table and the actions may be used individually or in conjunction with one another for optimal energy savings. The following examples describe only a limited number of possible actions. One embodiment lowers energy duration of non-use required before suspending the device's hard disk drives, therefore saving energy in proportion to the increase in hard drive standby times. In one example, hard drives consume, on average, 8.1 watts of energy when idling and 0.5 watts when in standby. A second embodiment lowers the duration of non-use required before suspending a device's display; power consumption for displays vary, but all displays consume less power when in standby mode. A third embodiment lowers the duration of non-use required before suspending the entire computational device and all of its peripherals; depending on the types of peripherals in a given system, power consumption may be reduced through automatically moving to standby mode any peripheral not in use for a given non-use duration, without affecting the overall performance of the parts of the computer system still in active use.

Multiprocessing is the use of two or more central processing units (CPUs) within a single computer system. On a multiprocessor, different threads and processes can run simultaneously on different processors or cores; for example, a virus scan application may create a new thread for the scan process, while a graphical user interface (GUI) thread waits for commands from the user. Multi-core architecture may cause an unnecessary expenditure of power when a single thread is doing all heavy lifting and the work is not balanced evenly across multiple cores. Thus, some embodiments of the present invention may allocate tasks across multiple cores as a function of minimizing overall chip energy use, and in some examples cores and threads may be suspended when not in use or in order to correct workload imbalances between threads running one program. In another example a core may be turned off dependant on the energy usage of the entire computational device, for example if no excess energy is expended turning the processor back on and the state of the processor is unchanged from it turning off and on. Additional processes of a computing device may be transferred into one or more low power states as a result shutting off cores or threads; for example, memory components may be moved to lower power consumption modes as a function of low or idle device processing activity, as when a processor is doing less work there is generally less activity for other components of the computer.

Client-server computing is a process by which clients make requests to servers who provide responses to client requests. According to the present invention a client may choose between green server and normal energy-use-independent configurations. In one embodiment, upon system invocation requests from the computational device, the client may be directed to green, energy-saving servers instead of standard-operating servers.

Invocation of energy savings at 101 may occur through a plurality of apparatuses or software programs. Some embodiments are described more fully below and other examples will be apparent to one skilled in the art, and numerous modifications and substitutions are possible without deviating from the claims of the invention. Thus, in one embodiment, operation of an additional button on a computer system or computer system keyboard accomplishes invocation at 101, whereupon actuation a system or device enters a reduced consumption mode, and upon a second actuation the system may return to a normal operation without consumption restrictions. Other embodiments may invoke various states or energy saving behavior upon each subsequent button depression, before a final depression returning the computer to a normal state. Energy conservative computing may also be invoked from a program installed on the computational device. The program may be invoked using methods known in the art such as a desktop icon, a system tray icon, or invocation from an application menu. Upon invocation, the system may display a menu system permitting the user to select details for the energy conservative state or may enter the conservative state directly. One embodiment of a system configuration may comprise a sensor system that automatically executes power-saving methods when the user vacates the vicinity of the computer system, and ends said methods when the user returns to the vicinity of the computer system. An embodiment of a combination configuration may include this sensor system, where the user inputs the parameters of what the vicinity of the computer system is and wears, for example, a badge-like responsive sensor to notify the computer system that the user is entering or exiting the preset vicinity. Another example may involve voice-recognition applications where the user speaks a preset phrase that notifies the computer system that the user is entering or exiting the vicinity.

In one aspect, invocation at 101 and/or energy savings display at 111 may be configured to provide positive feedback to a user and otherwise encourage implementation and continued use of energy savings modes invoked. Thus, a button may be configured to indicate when a low-energy mode has been selected and to reinforce the benefits accruing, for example, bearing a pleasing picture or icon of the earth, with a pleasing glow or light shining, one that a user would be loath to extinguish, or may even feel guilt from extinguishing, by reverting back to a high-performance and high-energy mode. The strength or luminance of such an energy savings indicating light, image or icon may also be proportionate to the energy savings affected or accrued, thus providing direct positive feedback to the user.

A slider or other graduated invoking means slider switch may be provided, enabling a user to select an amount of energy savings based on the position of an indicator along a continuum of possible energy savings or savings rates. Thus, a slider switch may incorporate a numerical scale, for example numbered from lowest energy savings setting at zero (disabling green computing capabilities) up to a highest "ten" indicating a largest possible amount of energy conservation for a given configuration or task. Other embodiments may incorporate a color gradient scale, for example moving from all red lighting for disabling green computing to all green lighting for maximum green computing. Thus, a user may be enabled to select a balance between an energy amount required for current operations and his desire to save energy. In one aspect, even if a user finds that he must increase device performance to speed the accomplishment of a given task, the slider may encourage him to only gradually increase performance and energy usage, perhaps only dimming but not extinguishing the illumination of an associated "green process selected" LED displayed to the user.

Thus, the present invention may encourage the user to invoke and maintain energy savings processes by communicating energy savings realized effectively and positively. Immediate and positive feedback may provide emotional satisfaction for a user, enough satisfaction for a user to operate the device in reduced energy consumption mode even with the potential reduction in performance of the computational device, in spite of a lack of any direct benefit to the user in saving energy.

In another aspect, a user may also be directly rewarded for achieving energy savings. More particularly, energy savings created by invoking energy-efficient processes may be monitored and aggregated and user's correspondingly awarded with direct benefits. In some embodiments, user may accumulate rewards or points with aggregated energy savings if a user invokes or requests a given power-savings process or mode and the invoked/requested process/mode is implemented and is effective in saving power. In one aspect, points awarded may be dependent upon minimum thresholds, thereby encouraging minimum standards of energy savings implementations. Thresholds may be determined in a number of ways, including for example requiring a threshold decrease in power use for a minimum threshold time.

Thus, in some embodiments, displaying energy savings at 111 comprises displaying a reward aggregator to the user of FIG. 1, thereby providing immediate positive feedback and encouragement to the user to continue saving energy, and to increase energy savings if possible in order to receive even more rewards. Reward aggregating may be dynamic, updated continuously in real-time or at defined intervals, thereby further increasing the encouragement of continued energy savings in proportion to the growing rewards displayed to the user.

Some embodiments may use a point system, wherein aggregated points may thus be redeemed for cash and other monetary awards such as account credits, coupons and rebates, as well as for tangible goods, services, and access to restricted areas and functions such as web pages providing discounts; other rewards will also be apparent to one skilled in the art. In some embodiments point aggregators are web-based, allowing a user to execute energy savings on their current computational device from any internet connection. A web-based logic may involve a point system where the user is awarded points each time they invoke power savings on their current computational device, the tally of points stored within the web-based application, as well as accumulating points for invoking power savings on each of a plurality of other computational devices associated with the user, for example including the user's desktop computer, laptop computer, mobile phone, and personal digital audio player or other entertainment device. In some examples, a client-based aggregator may be displayed wherein the point aggregator is available only on an authorized or designated individual device or devices, for example on a subscription basis from a service provider within a closed system. Displayed aggregator may also scroll savings values and accumulated points totals across a dedicated display in ticker-tape fashion, in one aspect alerting the user of updated information as it is calculated.

Referring again to FIG. 1, in another aspect of the present invention if no savings are found a user may be notified at 107, for example, by an on-screen display. If savings are unavailable to the user, at 113, an additional query may be made to find any viable alternatives to current system operation that will allow energy savings. In some embodiments, a user may be informed of device components, software, or other additional devices that may be purchased and implemented by the user to enable additional energy savings methods. For example, when the user attempts to invoke an energy-savings mode a device, system or service provider may access and search a database of energy-efficient device components such as hard drives or GUI displays and identify and inform the user of one or more components appropriate for purchase and implementation. In one aspect, this provides additional value to the user and/or a company, organization or other principal employing the user, as well as providing for sales and other business opportunities for advertisers, component providers and manufacturers, and for service providers that may offer energy-savings systems and services for fees and other consideration.

Thus, if viable hardware/software applications are available, the user may be notified at 109 and given the option at 121 of acquiring the additional component, software or equipment to enhance the current system. After acquiring the alternatives, the system may query again at 103. If no viable alternatives are available at 113 or if the user does not select one at 121, the system goes to the data trace at 118 and then to end at 119.

If savings are found during the query at 103, they are applied at 105. At 111 the computational device communicates to the user the energy savings, which may include current and cumulative energy savings, which have occurred because of invoking the energy-saving system, as well as dynamically updated alternatives periodically notifying the user of updated current and cumulative savings. In some embodiments, the savings may be automatically applied, as a background function of the system. For example, a sensor-based system may involve automatic application when the user exits the vicinity of the computing system or speaks a preset phrase, as discussed above.

In some embodiments, a system or process may have active or manual configurations that, for example, allow the user to have choices in determining the energy saving process configuration. In one illustration, a menu listing the processes found by the query at 103, including the option to dim the screen, shut off one or more threads, or reduce stand-by periods, may be displayed to the user at 111, enabling the user to choose one, all, or any combination thereof, of the listed processes.

Some embodiments may modify the device's power supply at 105 to enable discovery of current energy load. One example may include deducting the current "green state" load from the "normal state" load to ascertain the current energy savings. A cumulative count of current savings in green mode may be kept to ascertain the total savings for this device when operated in green state. Furthermore, when a green server selection method is invoked, savings may be estimated by the client or returned as part of a response from the green server and added to current or cumulative savings.

The continued availability of energy saving methods may be checked at 115. If savings are still available, the methods will continue to be implemented until the user halts the energy savings invocation at 117, wherein a data trace is made at 118 and the system ends at 119. The query at 103 is executed again if methods become unavailable at 115.

At 118 a data trace is created of energy-savings activities. In some embodiments, queries by a user, alternatives suggested, and energy savings implemented are saved to a database. A user may access the database to view how many queries have been made, energy savings available to the user, and any system improvements or configurations that may improve energy savings and whether or not any of the improvements/configurations have been implemented in the system. In another example, a database may contain a catalogue of invoked savings processes and their durations, in some examples observing time periods for which savings processes generally lasted before halted by a user at 117 or were discontinued due to unavailability.

Figure 2:
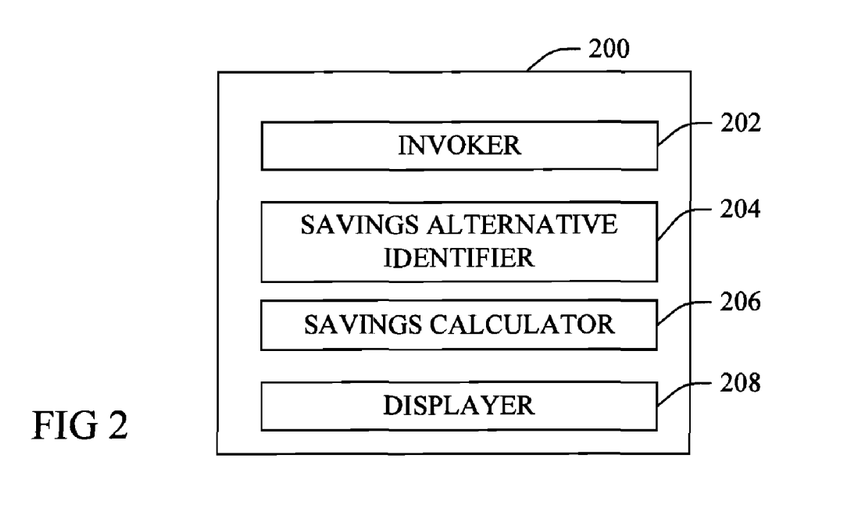
FIG. 2 is a system for invoking reduced energy consumption and notifying a user of energy savings data according to the present invention.

FIG. 2 illustrates an embodiment of a power-savings system 200 according to the present invention configured to perform processes described above, and comprising an Invoker 202, a Savings Alternative Identifier 204, a Savings Calculator 206 and a Displayer 208. The Invoker 202 comprises logic components configured for executing a reduced energy consumption mode on a computer processing system according to the present invention. In some embodiments, the Invoker 202 is initiated or operated through computer system, keyboard button, slider switch or rocker switch or desktop icon processes and inputs, for example as described above with respect to the processes illustrated in FIG. 1.

The Savings Alternative Identifier 204 identifies available energy savings for the computational device. In one embodiment, the Savings Alternative Identifier 204 determines the areas of highest power consumption within the computational device and then queries a policy table listing the methods to reduce power consumption in these areas, for example, lowering monitor display energy usage but still maintaining high clarity or lowering computational device temperature by putting in sleep mode all programs not currently in use. In another embodiment the Savings Alternative Identifier 204 determines current hardware usage and queries a given policy table with methods for shutting down or putting in standby modes computer device peripherals or other hardware systems that have not been in use for a given period of time. The Savings Alternative Identifier 204 may automatically apply found energy savings or may enable a user to actively participate or manually select one of the energy saving configurations, for example, as discussed previously at 105 above.

One embodiment of Savings Alternative Identifier 204 creates a data trace database which may include a tally of all queries made, a cumulative count of when energy savings are available and when they are not, and a listing of all alternatives identified to the user for increasing the current energy savings or for implementing any energy savings.

The Savings Calculator 206 may compute possible or actual energy savings for the computational device. One embodiment may perform a one-time calculation of energy savings followed by periodically occurring calculations that are added on to the one-time calculation to give a cumulative energy savings. Embodiments may also modify the computational device's power supply to allow a reading of the device's current energy usage to be taken, and in some examples this usage value may then be subtracted from an average load value saved within the system to ascertain the current energy savings. Average loads may be specified or user-input values or they may be calculated by the system according to the present invention and retained in the data trace.

In another embodiment of the Savings Calculator 206, a database of previous energy savings calculations may be queried each time the system is implemented and a cumulative calculation completed by adding current calculations to calculations previously listed within the database. In an example, current calculations may be added to the entirety of the previously saved calculations or the user may set a date parameter, where the savings before or after a certain date are ignored.

The Displayer 208 may communicate energy savings data to the user, for example as discussed above. One embodiment may create a dedicated display on a computational device displaying the current and cumulative savings as computed by the Savings Calculator 206. The Displayer 208 may notify the user of increased energy savings available by the use of other alternatives not being employed in the existing computational device or system, wherein the user may choose to implement these alternatives or to continue with the current system. As discussed above, the Displayer 208 may also notify the user when energy savings are not available, and in some embodiments may notify the user of other possible green process options, for example, identifying machines, options, or other components that may be purchased, implemented or otherwise utilized to employ energy savings methods. Some examples may enable a user to select through from a list of suggested alternatives and thereby directly implement one or more alternatives, and further incorporate reward or point system aggregators.

II. Computerized Implementation

Figure 3:
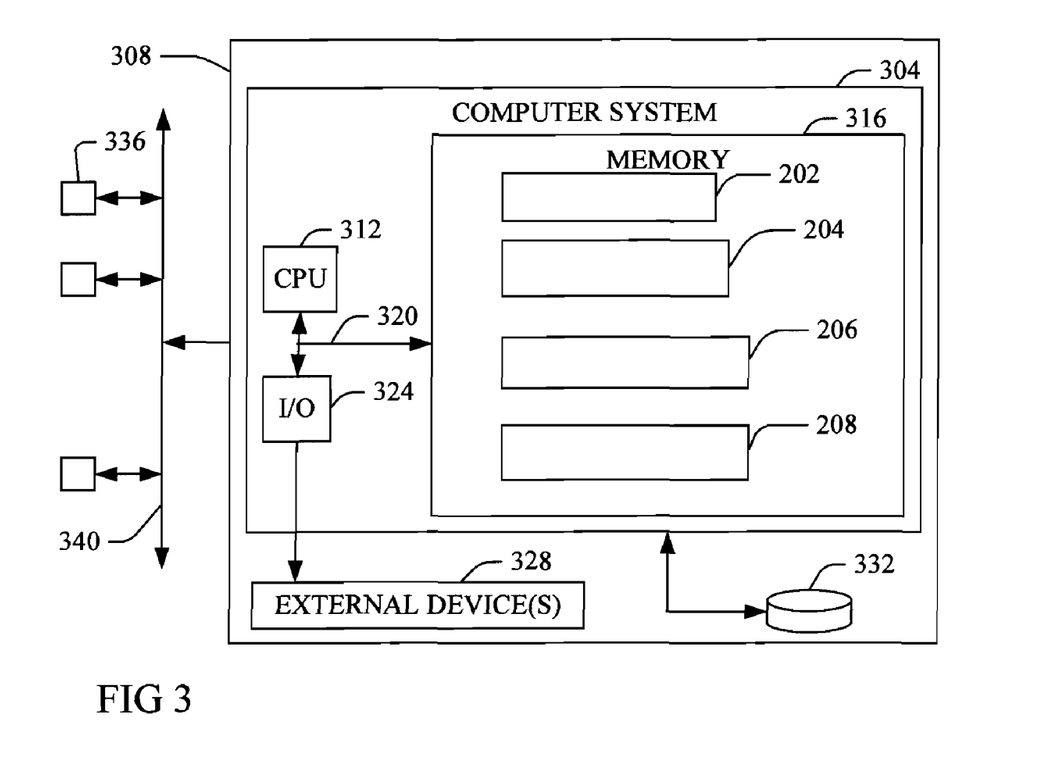
FIG. 3 is a block diagram illustrating an exemplary computerized implementation of a process and system for invoking reduced energy consumption and notifying a user of energy savings data according to the present invention.

Referring now to FIG. 3, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and system for implementing power savings on client-side computational devices as illustrated in FIGS. 1 and 2 and described above, including the Invoker 202, Savings Alternative Identifier 204, Savings Calculator 206 and Displayer 208 components discussed above, which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 3 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to perform the processes according to the present invention as discussed above. To this extent, the computer-readable/useable medium includes program code that implements each of the various process steps of the invention. It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation could be deployed, managed, serviced, etc. by a service provider who offers to implement, deploy, and/or perform the functions of the present invention for others, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention for one or more customers, and in return the service provider can receive payment from the customer(s) under a subscription and/or fee agreement and/or the service provider can receive payment from the sale of advertising content to one or more third parties. Thus, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for a user to invoke energy savings in the operation of a computational device, comprising:
   providing a computational device configured to perform a processing task in a high-performance mode;
   a user invoking an energy savings mode for the computational device to perform the processing task through a computational device interface, wherein the energy savings mode is more energy efficient than the high-performance mode, the invoking the energy savings mode comprising:
   querying a policy table containing a plurality of possible computational device energy savings modes to identify at least one mode appropriate to the processing task, wherein querying the policy table comprises determining that none of the plurality of possible energy savings modes are available or appropriate to the processing task;
   selecting and displaying a subset of the identified at least one appropriate mode queried wherein each of the selected subset is available to the user and suitable to a configuration of the device, wherein the displaying the subset comprises displaying alternative energy saving processes each implementable by the user by incorporating a new component into the computational device; and
   the user selecting and implementing one of the available subset by the user incorporating the new component into the computational device and selecting a one of the alternative energy saving processes associated with the new component;
   the computational device performing the processing task in the invoked energy savings mode;
   determining an energy amount expended by the computational device in performing the processing task in the invoked energy savings mode;
   determining a net energy savings value as a difference between the energy amount expended and a standard energy expenditure amount predicted as required for the computational device to perform the processing task in the high-performance mode;
   displaying the net energy savings value to the user; and
   the user continuing the invoking of the energy savings mode or engaging another performance mode for the computational device to perform the processing task as a function of the displaying.

2. The method of claim 1, the displaying energy savings comprising dynamically updating alternative energy saving processes and associated new components available to the user while the device is performing the processing task.

3. The method of claim 2, the displaying energy savings comprising displaying current and cumulative net energy savings.

4. The method of claim 2 wherein the computational device comprises a plurality of computer processing unit cores, and wherein the implementing of the selected energy savings process comprises causing the computational device to continue to perform the processing task by suspending one of the cores or transferring one of the cores into a low power state as a function of a processing load imbalance.

5. The method of claim 2, further comprising providing a slider having a pointer aligned to engage a graduated continuum scale;
   wherein the invoking comprises the user sliding the slider pointer into alignment with an index on the graduated continuum scale, the index correlated with a desired net energy savings value.

6. The method of claim 2, the determining the net energy savings value further comprising awarding a benefit value to the user in proportion to the determined net energy savings value; and
   the displaying the net energy savings value to the user further comprising dynamically displaying an accrued awarded benefit value.

7. The method of claim 2, the displaying energy savings comprising displaying an availability of a green energy source; and
   wherein the user continuing the invoking or engaging another performance mode comprises the user invoking a second energy savings mode, wherein invoking the second energy savings mode comprises correlating performance of the processing task with an availability of the green energy source.

8. The method of claim 1, further comprising displaying each of the selected subset with an associated predicted energy savings value.

9. A method for deploying an application for a user evoking energy savings in the operation of a computational device, comprising:
   providing a computational device infrastructure configured to:
   perform a processing task in a high-performance mode or a user-invoked energy savings mode, wherein the energy savings mode is more energy efficient than the high-performance mode;
   invoke the user-invoked energy savings mode by:
   querying a policy table containing a plurality of possible computational device energy savings modes to identify at least one mode appropriate to the processing task and determining that none of the plurality of possible energy savings modes is available or appropriate to the processing task;
   selecting a subset of the identified at least one appropriate mode queried wherein each of the selected subset is available to the user and suitable to a configuration of the device;
   displaying each of the selected subset with an associated predicted energy savings value by displaying alternative energy saving processes each implementable by the user by incorporating a new component into the computational device; and
   enabling the user to select and implement one of the available subset by the user incorporating the new component into the computational device and selecting a one of the alternative energy saving processes associated with the new component;

determine an energy amount expended by the computational device in performing the processing task in the user-invoked energy savings mode;

determine a net energy savings value as a difference between the energy amount expended and a standard energy expenditure amount predicted as required for the computational device to perform the processing task in the high-performance mode;

display the net energy savings value to the user; and enable the user to invoke the energy savings mode or engage another performance mode to perform the processing task as a function of the displaying.

10. The method for deploying an application of claim 9, the computer infrastructure configured to:

display energy savings by dynamically updating alternative energy saving processes and associated new components available to the user while the device is performing the processing task;

display energy savings by displaying current and cumulative net energy savings;

award a benefit value to the user in proportion to the determined net energy savings value; and display the net energy savings value to the user by dynamically displaying an accrued awarded benefit value.

11. A method for a user evoking energy savings in the operation of a computational device, comprising:

producing computer executable program code;

storing the code on a computer readable medium;

providing the program code to be deployed and executed on a computer system, cause the computer system to:

perform a processing task in a high-performance mode or a user-invoked energy savings mode;

invoke the user-invoked energy savings mode by:

querying a policy table containing a plurality of possible computational device energy savings modes to identify at least one mode appropriate to the processing task;

determining that none of the plurality of possible energy savings modes is available or appropriate to the processing task as a function of querying the policy table;

selecting a subset of the identified at least one appropriate mode queried wherein each of the selected subset is available to the user and suitable to a configuration of the device; and displaying each of the selected subset with an associated predicted energy savings value by displaying alternative energy saving processes each implementable by the user by incorporating a new component into the computational device; and enabling the user to select and implement one of the available subset by incorporating the new component into the computational device and selecting a one of the alternative energy saving processes associated with the new component;

determine an energy amount expended by the computational device in performing the processing task in the user-invoked energy savings mode;

determine a net energy savings value as a difference between the energy amount expended and a standard energy expenditure amount predicted as required for the computational device to perform the processing task in the high-performance mode;

display the net energy savings value to a user; and enable the user to invoke the energy savings mode or another performance mode to perform the processing task as a function of the displaying.

12. The method of claim 11, the program code comprising instructions which, when executed on the computer system, causes the computer system to:

display energy savings by dynamically updating alternative energy saving processes and associated new components available to the user while the device is performing the processing task;

display energy savings by displaying current and cumulative net energy savings;

award a benefit value to the user in proportion to the determined net energy savings value; and display the net energy savings value to the user by dynamically displaying an accrued awarded benefit value.

13. A programmable device comprising:

a processing means;

a memory in communication with the processing means comprising an invoker logic component, a savings calculator logic component, and a displayer logic component; and a network interface in communication with the processing means and the memory;

wherein the processing means is configured to:

perform a processing task in a high-performance mode or a user-invoked energy savings mode;

invoke the user-invoked energy savings mode by:

querying a policy table containing a plurality of possible computational device energy savings modes to identify at least one mode appropriate to the processing task and to determine that none of the plurality of possible energy savings modes is available or appropriate to the processing task;

selecting a subset of the identified at least one appropriate mode queried wherein each of the selected subset is available to the user and suitable to a configuration of the device; and displaying each of the selected subset with an associated predicted energy savings value by displaying identified alternative energy saving processes each implementable by the user by incorporating a new component into the computational device; and enabling the user to select and implement one of the available subset by incorporating the new component into the computational device and selecting one of the alternative energy saving processes associated with the new component;

determine an energy amount expended by the computational device in performing the processing task in the user-invoked energy savings mode;

determine a net energy savings value as a difference between the energy amount expended and a standard energy expenditure amount predicted as required for the computational device to perform the processing task in the high-performance mode;

display the net energy savings value to the user; and enable the user to invoke the energy savings mode or another performance mode for the computational device to perform the processing task as a function of the displaying.

14. The programmable device of claim 13, wherein the processing means is configured to:

display energy savings by dynamically updating alternative saving processes and associated new components available to the user while the device is performing the processing task;

display energy savings by displaying current and cumulative net energy savings;

award a benefit value to the user in proportion to the determined net energy savings value; and display the net energy savings value to the user by dynamically displaying an accrued award benefit value.

15. The programmable device of claim 13, further comprising a slider having a pointer aligned to engage a graduated continuum scale; wherein the programmable device is configured to correlate a user-desired net energy savings value with an index on the graduated continuum scale aligned with the slider-pointer.

* * * * *